United States Patent
Gassho et al.

(10) Patent No.: US 7,586,889 B2
(45) Date of Patent: *Sep. 8, 2009

(54) STATION FOR WIRELESS NETWORK

(75) Inventors: Kazuhito Gassho, Nagano-ken (JP); Susumu Shiohara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/783,430

(22) Filed: Apr. 9, 2007

(65) Prior Publication Data

US 2007/0253390 A1    Nov. 1, 2007

Related U.S. Application Data

(63) Continuation of application No. 10/284,482, filed on Oct. 31, 2002, now Pat. No. 7,212,513.

(30) Foreign Application Priority Data

Nov. 1, 2001    (JP) .............................. 2001-336232

(51) Int. Cl.
    *H04Q 7/24*    (2006.01)
(52) U.S. Cl. ...................................... 370/338; 370/466
(58) Field of Classification Search ........................ None
    See application file for complete search history.

(56) References Cited

U.S. PATENT DOCUMENTS

| 5,901,362 A | 5/1999 | Cheung et al. |
| 6,917,804 B2 * | 7/2005 | Takayama et al. ........ 455/432.1 |
| 2001/0024953 A1 | 9/2001 | Balogh |

FOREIGN PATENT DOCUMENTS

| EP | 0 984 652 A2 | 3/2000 |
| WO | WO 98/10565 A1 | 3/1998 |

* cited by examiner

*Primary Examiner*—Duc C Ho
(74) *Attorney, Agent, or Firm*—Sughrue Mion, PLLC

(57) ABSTRACT

A wireless network device, such as a printer, to enter an infrastructure-type user wireless LAN as a station, has an additional access point function. A printer having an ESS-ID 'MM' as an initial setting is connected with a user wireless LAN, which includes an access point and a personal computer and uses a common ESS-ID 'XX'. In this case, the procedure changes the ESS-ID set in the personal computer to 'MM' to establish an infrastructure-type communication with the printer. This arrangement enables the ESS-ID set in the printer to be changed to the common ESS-ID 'XX' for the user wireless LAN without varying the ESS-ID set in the access point. The technique of the invention ensures easy connection of any device without sufficient input interfaces to the wireless LAN.

8 Claims, 7 Drawing Sheets

STATION FOR WIRELESS NETWORK

This is a continuation of application Ser. No. 10/284,482 filed Oct. 31, 2002 now U.S. Pat. No. 7,212,513. The entire disclosures of the prior application, application Ser. No. 10/284,482 is hereby incorporated by reference.

BACKGROUND OF THE INVENTION

1. Field of the Invention

The present invention relates to a station to be connected to a wireless network.

2. Description of the Related Art

With recent advancement of network technology, devices like computers and printers are mutually connected via a network. The typical techniques that have come into practical use include the Internet and LANs (Local Area Networks). Wireless networks have become popular, in addition to cable networks.

There are two major systems to attain a wireless network; one is called the infrastructure system and another is called the Ad Hoc system. The infrastructure system utilizes a star-shaped network where stations (ST) are concentrically connected by a relay center called an access point (AP). In the infrastructure system, the access point that transmits a beacon continuously manages the group of stations to be connected, regardless of the actual data transmission. This ensures stable connection. The Ad Hoc system attains peer-to-peer communication between devices by using a simple connection method. The drawback of the Ad Hoc system is relatively low connection stableness.

The infrastructure system utilizes identification called ESS-ID (Extended Service Set-ID) for prevention of interference. The ESS-ID is identification for grouping stations in a wireless network. ESS-ID in all devices involved in communication is to be set equivalent to establish a network based on the infrastructure system.

Setting of the ESS-ID is rather troublesome in a device without sufficient input interfaces, such as a printer.

FIG. 1 schematically shows a prior art setting in the case of connecting a device without insufficient input interfaces to a wireless LAN. In this example, a printer $20z$ having a print server for wireless communication is newly joined in an existing wireless LAN environment including an access point $10z$ and a user's personal computer $30z$. In the user wireless LAN, the access point $10z$ attains concentric connection. The printer $20z$ can be connected to the user wireless LAN by changing the settings therein through the following operations of the personal computer $30z$.

A common ESS-ID 'XX' is supposed to be set for each device in the user wireless LAN, such as the access point $10z$ and the personal computer $30z$. An ESS-ID 'MM' is supposed to be the initial setting in the printer $20z$.

At a timing Sz01, the user transmits an instruction of changing the setting of ESS-ID to 'MM', the initial setting in the printer $20z$, from the personal computer $30z$ to the access point $10z$ via the wireless LAN. The access point $10z$ is accordingly disconnected from the personal computer $30z$, while being connected with the printer $20z$ having the identical setting of the ESS-ID 'MM'. In the illustration of FIG. 1, the hatching represents connection between the respective devices.

At a timing Sz02, the user changes the ESS-ID set in the personal computer $30z$ to 'MM'. The personal computer $30z$ is accordingly connected to the access point $10z$, and may further be connected with the printer $20z$ by the relay functions of the access point $10z$. In this state, at a timing Sz03, the user transmits an instruction of changing the ESS-ID of the printer $20z$ to the common ESS-ID 'XX' to the printer $20z$.

The user then returns the ESS-ID of the access point $10z$ and the personal computer $30z$ to the common ESS-ID 'XX' for the user wireless LAN at timings Sz04 and Sz05, respectively. This completes additional connection of the printer $20z$ with the existing user wireless LAN environment.

This prior art method requires the rather complicated processing for connection of the personal computer $30z$ with the printer $20z$, prior to the actual change of the ESS-ID set in the printer $20z$. Namely the connection of the personal computer $30z$ to the printer $20z$ prior to the actual setting of the ESS-ID and the restoration of the personal computer $30z$ to the connection with the user wireless LAN after the setting require the redundant operations for changing the settings of the ESS-ID in the personal computer $30z$ and the access point $10z$.

One prior art technique to attain settings in a device without sufficient input interfaces utilizes a local connection, a LAN connection, or another cable connection for settings from a device like a personal computer. This prior art technique, however, requires a troublesome, separate cable connection only for settings in the wireless LAN.

The problems discussed above are not limited to the settings of the printer, but are commonly found in the settings in the case of connecting any device without sufficient input interfaces for settings to the wireless LAN.

SUMMARY OF THE INVENTION

The object of the present invention is thus to ensure easy connection of any station without sufficient input interfaces to a wireless network.

In order to attain at least part of the above and the other related objects, the present invention is directed to a station that is connected to an existing wireless network, in which multiple communication devices possessing same identification for communication mutually communicate via a relay device with the same identification. The station includes: a relay storage module that stores in advance relay identification which is a specific identification to be used when the station functions as an alternative relay device; a relay function module that realizes a temporary function as the alternative relay device and thereby establishes a temporary wireless network based on the relay identification; a terminal storage module that receives terminal identification, which is to be used when the station functions as one of the communication devices, via the temporary wireless network, and stores the terminal identification therein; and a terminal function module that establishes connection with the existing wireless network as a communication device with the terminal identification, and stops the function of the relay function module during the established connection.

The station of the present invention can realize the function as the relay device to establish a wireless network. The invention ensures establishment of a temporary wireless network including the station of the invention without changing the settings in an access point in an existing wireless LAN. The station receives the terminal identification via the temporary wireless network and is thus connectable with the existing wireless LAN. The arrangement of the invention thus ensures easy connection of the station with the existing wireless LAN.

The wireless network may be any of diverse systems, for example, IEEE802.11 or IEEE802.11b. Different systems may be applied for the existing wireless communication or the temporary wireless communication. In one preferable embodiment, the relay storage module stores multiple pieces of relay identification, and the relay function module selects one among the multiple pieces of relay identification to establish the temporary wireless network. The terminal identification may be stored in the terminal storage module after deletion of the existing terminal identification. The terminal identification may be additionally stored, while the existing terminal identification is kept unchanged.

In accordance with one useful application of the station, the terminal storage module receives and stores the terminal identification in response to a user's instruction.

This arrangement facilitates setting and resetting in the case of connecting a device without sufficient input interface for settings to a wireless LAN.

In one preferable embodiment, the station further has a switchover control module that temporarily stops the function of the terminal function module and activates the function of the relay function module at a predetermined timing after establishment of the connection by the terminal function module.

The station of this embodiment has both the communication function as the station and the communication function as the access point.

Activation of the relay function module may be carried out at preset time intervals or on occasions of some events.

In another preferable embodiment, the station further has an updating module that updates the relay identification based on an instruction receiving via the existing wireless network.

This arrangement enables the temporary wireless network to be selected, based on the updated relay identification.

The updating module may store the updated relay identification after deletion of the existing relay identification. The updated relay identification may otherwise be stored additionally, while the existing relay identification is kept unchanged. The updating module may utilize both the communication by the relay function module and the communication by the terminal function module to fetch the update information.

In accordance with one preferable application of the above embodiment, the relay storage module updates the storage in the relay storage module while keeping initial relay identification originally stored in the station as initial relay identification. The station further has a reset instruction module that resets the storage in the relay storage module to the initial relay identification.

This arrangement enables the terminal identification to be readily acquired via the communication utilizing the initial relay identification, even after storage of the relay identification into the relay storage module. The wireless LAN can be reconstructed relatively easily with the initial relay identification, even when the setting of the relay identification in the station is completely unknown.

The station may be constructed as a network communication unit that is activated to connect a printer to the existing wireless network via the external access point.

For example, the station of the present invention may be a network communication unit integrated with a printer or another device. The station may be constructed as a computer that is connected to such a device by cable and has server functions. The station may otherwise be any substrate, card, board or the like attachable to such a device. The station of the invention is not restricted to these examples but may have any adequate construction.

The technique of the present invention is not restricted to the stations but may be actualized by a diversity of other applications, for example, corresponding methods of connecting a station with a wireless network, computer programs that cause a computer to attain these methods and equivalent signals thereto, and recording media in which such computer programs are recorded.

Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

The above and other objects, features, aspects, and advantages of the present invention will become more apparent from the following detailed description of the preferred embodiments with the accompanying drawings.

DESCRIPTION OF THE PREFERRED EMBODIMENTS

Some modes of carrying out the present invention are discussed below as preferred embodiments in the following sequence:

A. First Embodiment
B. Modified Example
C. Second Embodiment

A. First Embodiment

Figure 1:
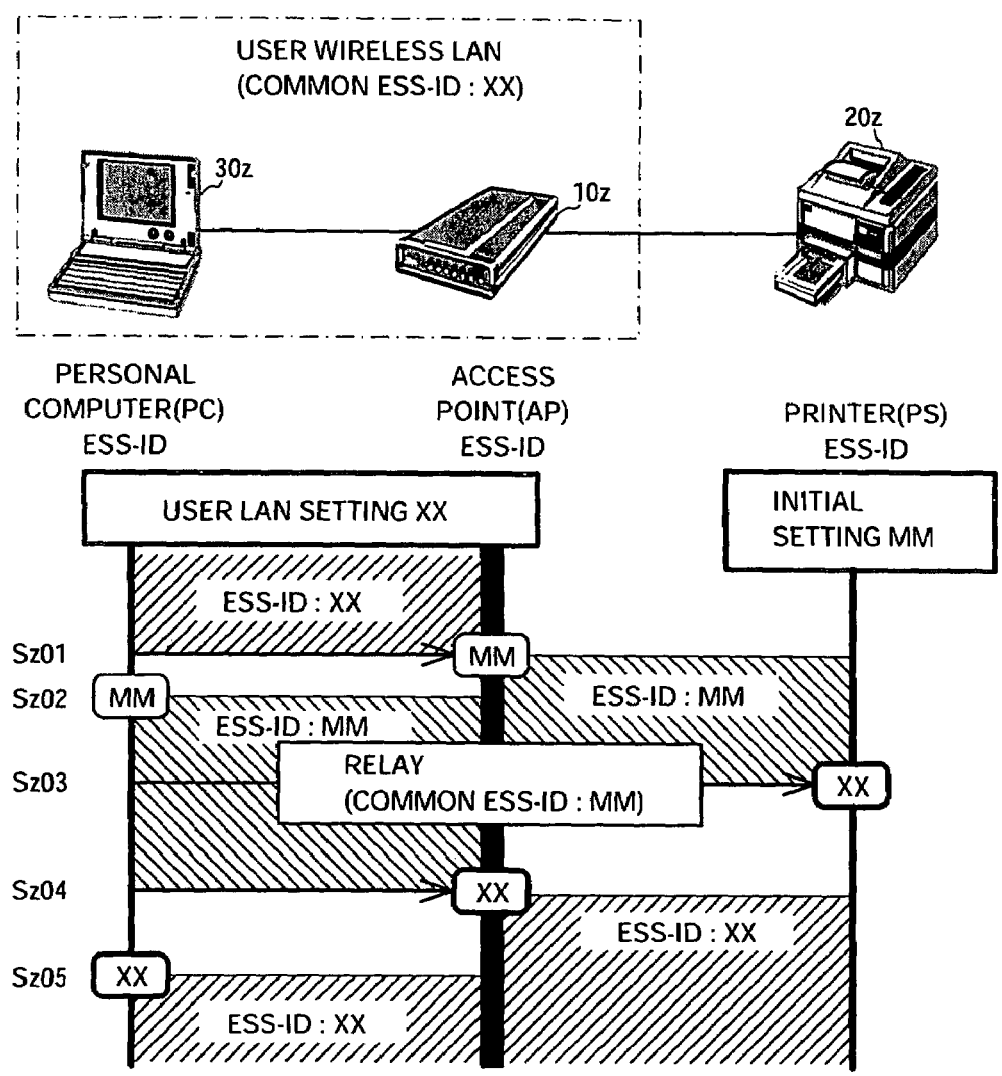
FIG. 1 schematically illustrates a prior art technique of setting an ESS-ID for a wireless LAN.
Figure 2:
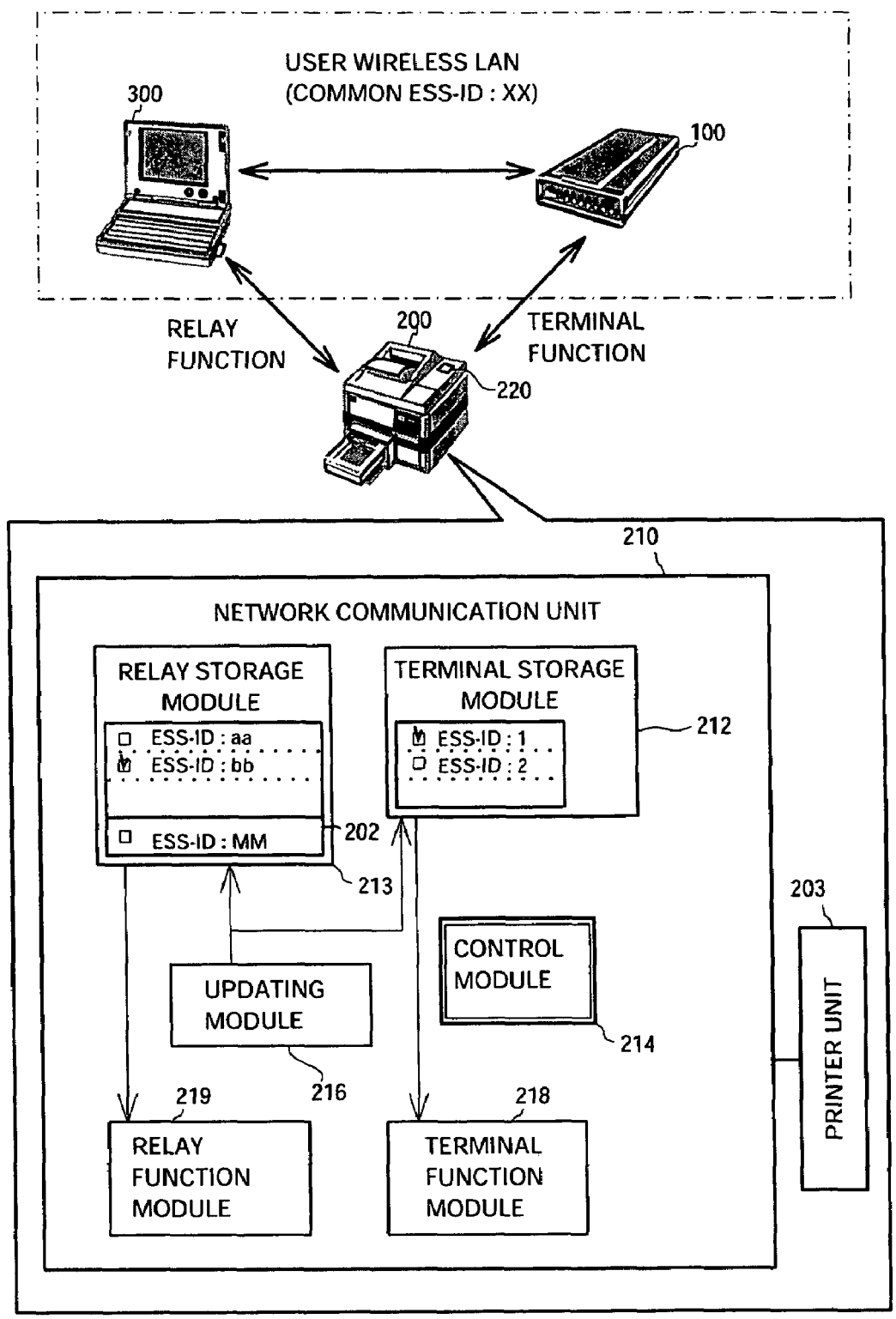
FIG. 2 schematically illustrates the construction of a system including a printer, which acquires a common ESS-ID for a wireless LAN in a first embodiment of the present invention.

FIG. 2 illustrates the construction of a printer 200. The user wireless LAN is constructed to include an access point 100 and a personal computer 300. The personal computer 300 is one of the stations currently involved in the user wireless LAN and sets a common ESS-ID 'XX' for the user wireless LAN in the printer 200, based on a user's input. The printer 200 and the personal computer 300 have radio communication modules to attain wireless communication with the access point 100.

A functional block diagram of the printer 200 is also shown in FIG. 2. The printer 200 has a microcomputer including a CPU and memories. The respective functional blocks illustrated in FIG. 2 are attained by software executed by the CPU in this embodiment, although these functional blocks may be actualized by hardware.

The printer 200 has a printer unit 203 and a network communication unit 210. The printer unit 203 is the functional block to carry out printing functions. The network communication unit 210 functions wireless communication.

A relay function module 219 carries out functions as an access point, for example, transmission of a beacon. A terminal function module 218 carries out functions as a station.

A relay storage module 213 stores ESS-IDs used by the relay function module 219. A terminal storage module 212 stores ESS-IDs used by the terminal function module 218. The relay storage module 213 stores a initial relay initial ESS-ID 202 originally stored in the printer 200, independently of the other ESS-IDs.

The relay function module 219 utilizes one of the ESS-IDs stored in the relay storage sub-module 213 (hereafter referred to as the relay IDs) to establish communication as the access point with stations devices. The terminal function module 218 utilizes one of the ESS-IDs stored in the terminal storage module 212 (hereafter referred to as the terminal IDs) to establish a temporary communication as the station with the other stations. The user can reset the relay ID to the initial relay ESS-ID (hereinafter referred to as the initial relay ID) through operations of a control panel 220.

An updating module 216 functions to acquire a terminal ID through the temporary communication as the access point and store the acquired terminal ID into the terminal storage module 212. The user operates the control panel 220 and activates the updating module 216 to start acquiring the terminal ID. The updating module 216 also functions to acquire a relay ID through the wireless communication as the access point and store the relay ID into the relay storage module 213.

The control module 214 functions to totally control the respective functional blocks of the network communication unit 210. More specifically, the control module 214 implements diverse series of processing based on the user's input through operations of the control panel 220 or based on the user's input received via the communication as the access point or as the station, by total control of the respective functional blocks of the network communication unit 210.

The control module 214 temporarily ceases the terminal function module 218 and activates the relay function module 219 at a predetermined timing after establishment of connection by the terminal function module 218. The control module 214 also actuates the updating module 216 to acquire a relay ID via the wireless communication and store it into the relay storage module 213. The stored relay ID is used for the processing executed by the relay function module 219, especially for the processing by the relay function module 219 based on the switchover control function. The ESS-ID stored in the storage module 211 may be transmitted to an external device via a wireless network established by the processing of the relay function module 219 based on the switchover control function.

Figure 3:
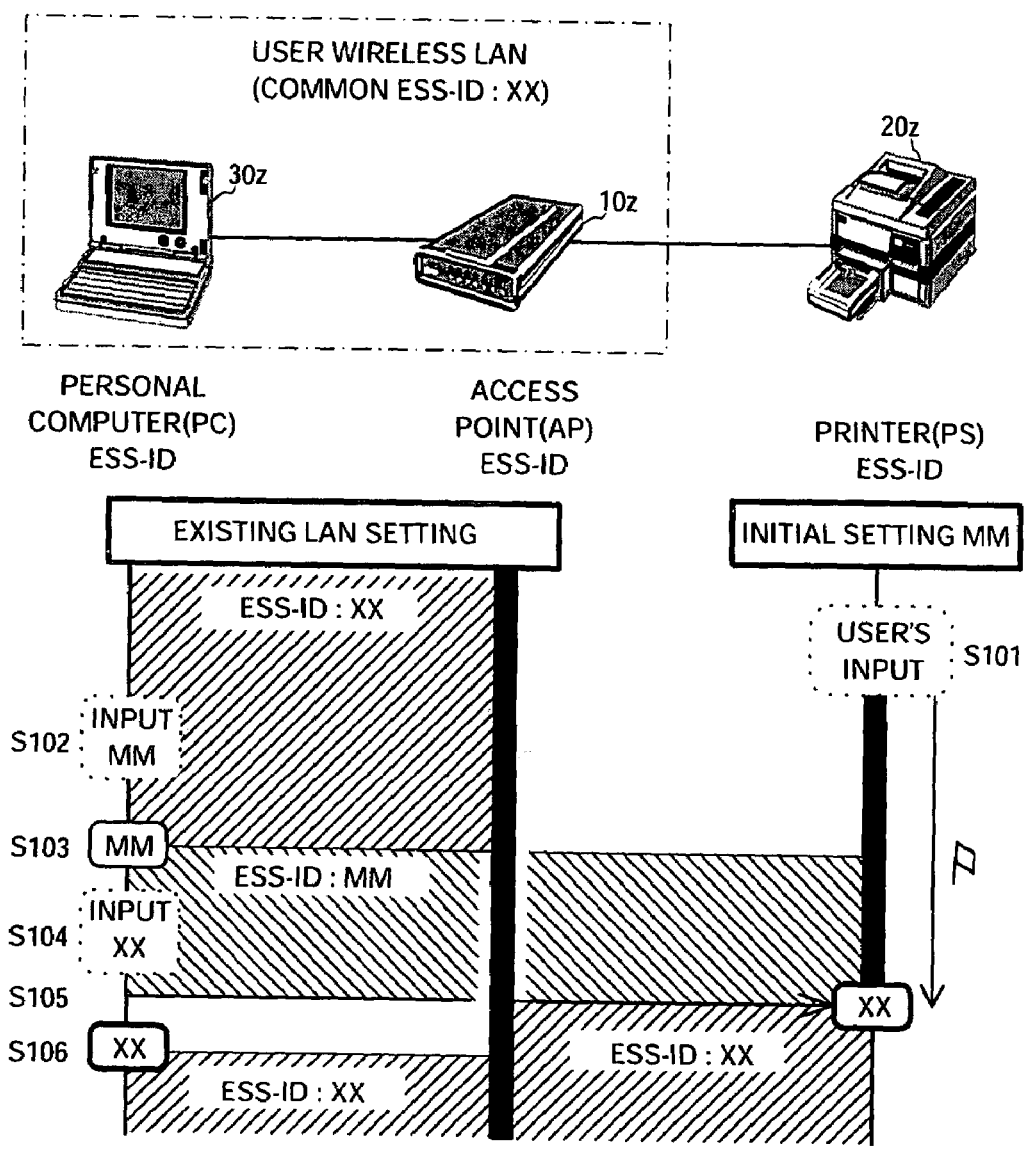
FIG. 3 shows a process of setting an ESS-ID executed in the first embodiment.

FIG. 3 shows an exemplified process of setting an ESS-ID carried out in the embodiment. This is a procedure of setting the ESS-ID in the case where the printer 200 is newly connected with the existing user wireless LAN. An initial setting 'MM' of the relay ID is set in the printer 200. The user operates the control panel 220 and gives an instruction to the printer 200 to establish wireless communication as the access point with the relay ID 'MM' and thereby acquire and set a terminal ID.

At a timing S101, the user operates the control panel 220 to start up the ESS-ID acquiring functions of the printer 200. The printer 200 accordingly functions as the access point, for example, transmission of a beacon, based on the relay ID set to the initial setting 'MM'.

At a subsequent timing S102, the user inputs the ESS-ID 'MM', which is to be utilized in the communication for the settings in the printer 200, into the personal computer 300. The processes of the timings S101 and S102 may be carried out in an inverse order.

At a timing S103, the user changes the ESS-ID of the personal computer 300 to 'MM'. The personal computer 300 is then disconnected from the access point 100 and withdrawn from the user wireless LAN, while receiving a beacon sent from the printer 200 and establishing temporary connection with the printer 200.

At a subsequent timing S104, the user inputs an ESS-ID, which is to be transmitted to and set in the printer 200, in the personal computer 300. In this example, a common ESS-ID 'XX' for the user wireless LAN is input into the personal computer 300. At a timing S105, an user's instruction for the actual transmission to and setting in the printer 200 is given to the personal computer 300. The input common ESS-ID 'XX' for the user wireless LAN is then actually transmitted to and set in the printer 200.

The printer 200 receives the transmission from the personal computer 300 and stores the common ESS-ID 'XX' for the user wireless LAN as the terminal ID into the terminal storage module 212. On the acquisition and setting of the ESS-ID, the printer 200 ceases the relay communication function kept for acquiring the ESS-ID, while starting communication as the station with the newly acquired terminal ID 'XX'. The printer 200 starting communication as the station with the acquired terminal ID detects a beacon transmitted from the access point 100 to hold communication and establish connection with the user wireless LAN.

At a timing S106, the personal computer 300 resumes the wireless communication as the station with the access point 100 based on the common ESS-ID 'XX'. The personal computer 300 accordingly returns to the user wireless LAN. This completes all the series of processing carried out to make the printer 200 enter into the user wireless LAN.

Figure 4:
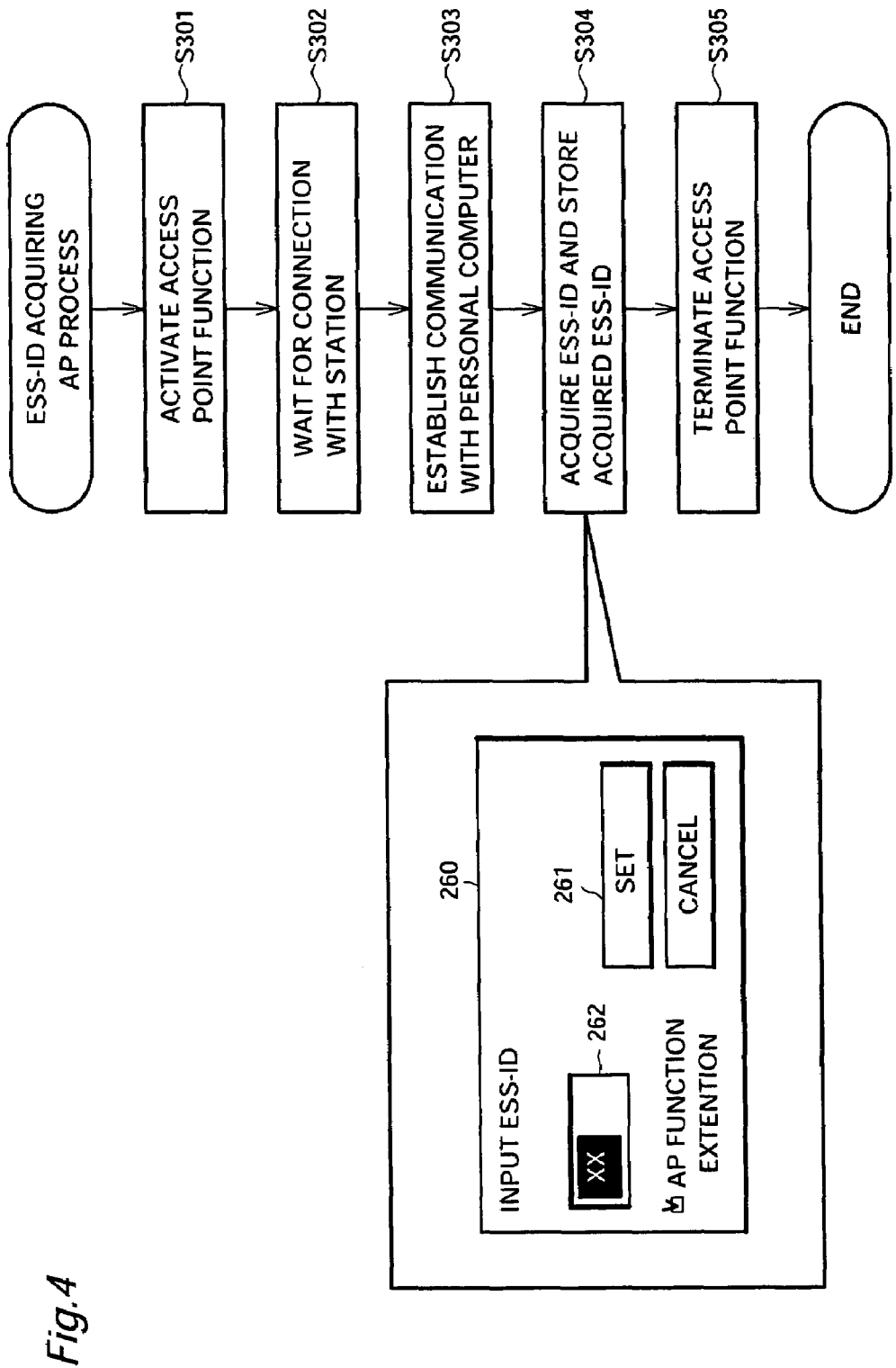
FIG. 4 is a flowchart showing a processing routine of acquiring an ESS-ID executed in the first embodiment.

FIG. 4 is a flowchart showing a processing routine of acquiring the ESS-ID. An interface 260, which may be used by the user of the personal computer 300 for transmission of the ESS-ID, is also shown in FIG. 4.

The functions as the access point are activated first at step S301. The procedure of step S301 takes an ESS-ID, which is to be utilized for communication as the access point, out of the relay storage module 213 and sets the ESS-ID in the relay function module 219, which transmits a beacon to external devices functioning as stations (refer to the timing S101 in FIG. 3). The procedure of subsequent step S302 waits for establishment of communication with any external device as the station having the identical ESS-ID.

Wireless communication with the personal computer 300 is then established as a wireless network for settings at step S303 (refer to the timing S103 in FIG. 3). In this example, the establishment of the wireless communication is based on the identical ESS-ID 'MM' shared by the printer 200 and the personal computer 300.

The procedure of subsequent step S304 actually acquires an ESS-ID via the established communication. The printer 200 acquires an ESS-ID 'XX' from the personal computer 300 and stores the acquired ESS-ID 'XX' therein (refer to the timing S105 in FIG. 3). The acquired ESS-ID 'XX' is stored in the terminal storage module 212.

A utility software program for setting the ESS-ID is used for the transmission of the ESS-ID from the personal computer 300 to the printer 200. The utility software program utilizes the temporary wireless communication with the printer 200 as the access point. The user can transmit a desired terminal ID to the printer 200 and set the transmitted terminal ID in the printer 200 via an interface provided by the utility software program.

Referring to FIG. 4, an ESS-ID input window 260 used as the interface for the setting the ESS-ID has an ESS-ID input box 262. The common ESS-ID for the user wireless LAN, in which the personal computer 300 was involved until just before, is displayed in the ESS-ID input box 262. The user can change the ESS-ID displayed in the ESS-ID input box 262. A click of a Set button 261 on the input window 260 executes transmission of the ESS-ID via the established communication of the wireless network for settings. The user terminates the utility software program after the setting, and returns the ESS-ID of the personal computer 300 to the original setting 'XX'. The personal computer 300 accordingly returns to the user wireless LAN.

The printer 200 has concluded the acquisition and the storage of the ESS-ID at step S304 and ceases the functions as the access point, such as transmission of a beacon, at step S305 (refer to the timing S105 in FIG. 3). The printer 200 concludes all the processing routine for acquiring the ESS-ID and is ready for communication as the station with the access point 100.

The system of this embodiment ensures easy settings in the case of connecting a device without generous input interfaces for the settings to the wireless LAN.

B. Modified Example

In the above embodiment, the ESS-ID is set according to the user's operations. The setting of the ESS-ID may be carried out automatically. A series of processing for such auto setting is discussed briefly as a modified example.

Figure 5:
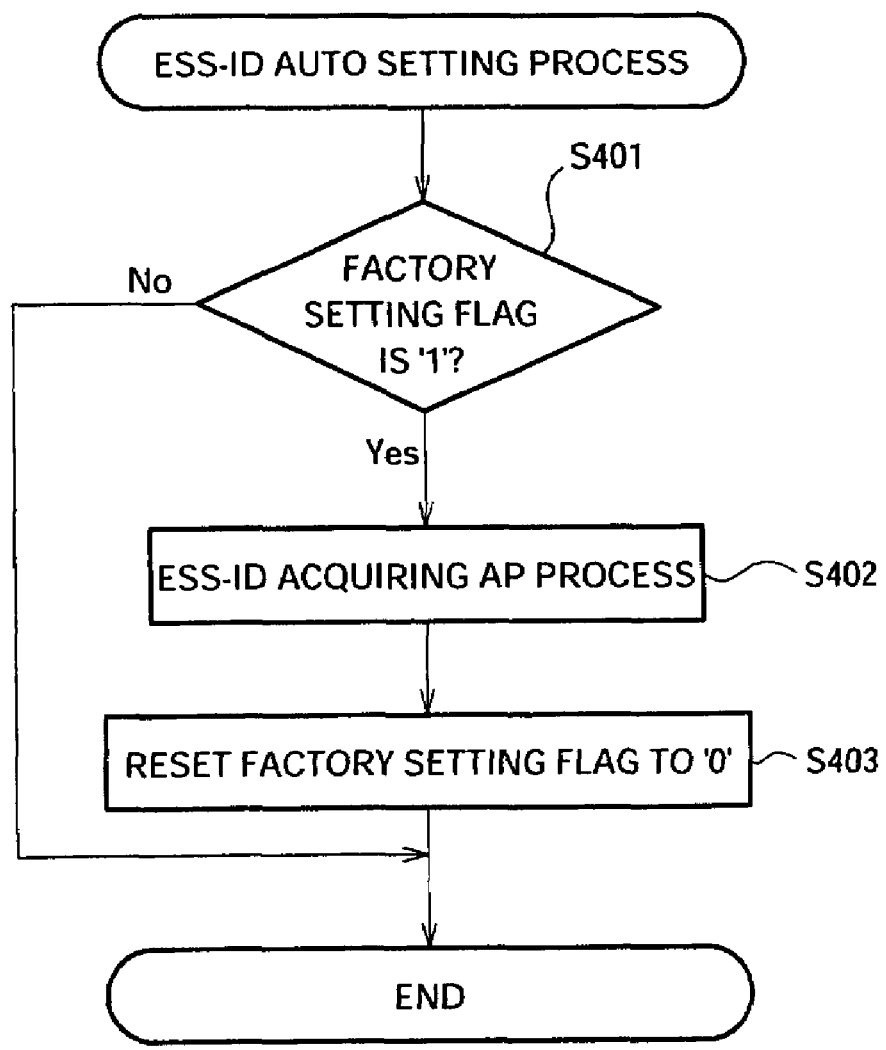
FIG. 5 is a flowchart showing a processing routine of auto setting of an ESS-ID as a modified example of the first embodiment.

FIG. 5 is a flowchart showing a processing routine for auto setting of the ESS-ID. In this example, auto setting of the ESS-ID is carried out in response to a first power supply in the state of factory setting. The printer 200 starts this auto setting routine on each supply of power.

The program first determines whether the printer 200 is in the state of factory setting or in the state of no factory setting at step S401. When the printer 200 is in the state of no factory setting, it means that the ESS-ID to be used for communication as the station has already been set. The program thus immediately exits from this auto setting routine without any further processing. The state of factory setting may be specified, for example, in response to detection of a factory setting flag '1' by the control module 214.

In the state of factory setting, on the other hand, the process of automatically acquiring ESS-ID starts. At step S402, the ESS-ID acquiring AP (access point) process is carried out with the initial relay ID. The processing at this step is identical with the process explained in the first embodiment and stores the acquired ESS-ID into the terminal storage module 212. At subsequent step S403, the factory setting flag is reset to a value '0' representing the state of no factory setting. The processing of steps S402 and S403 is then not performed at the time of a next power supply.

According to the procedure of the modified example, the ESS-ID is automatically set in response to the first power supply in the state of factory setting. This further simplifies the setting of the ESS-ID. The start timing of auto setting is not restricted to this example, but may be any of diverse timings, for example, after disconnection from the access point 100 for updating for a preset time period.

C. Second Embodiment

The following describes a second embodiment of the present invention, where the control module 214 realizes the switchover control function, by which the terminal function module 218 is temporarily ceased and the relay function module 219 is activated at a preset timing even after the acquisition of the ESS-ID. In the second embodiment discussed here, the ESS-ID of the printer 200 is supposed to be transferred to an additional printer PS2 (500). This series of processing is carried out in response to a click of the AP function extension checkbox 263 included in the ESS-ID input window 260.

Figure 6:
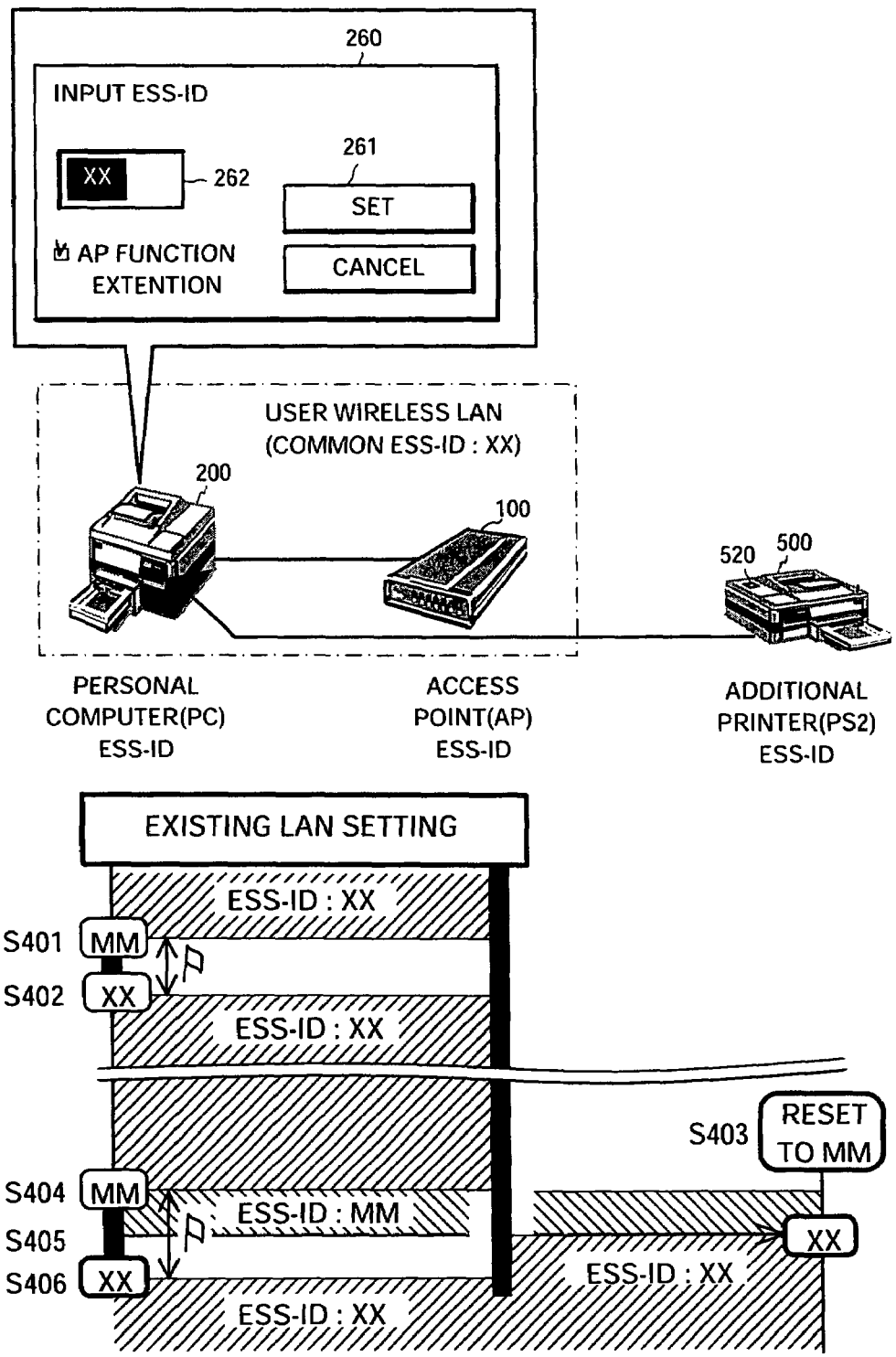
FIG. 6 schematically illustrates the process of transferring the ESS-ID in the second embodiment.

FIG. 6 schematically illustrates the process of transferring the ESS-ID in the second embodiment, with a timing chart 800 of processing. The printer 200 has acquired in advance the common ESS-ID for the user wireless LAN as discussed previously in the first embodiment. The printer 200 may continue the wireless communication as the access point even after the acquisition of the ESS-ID based on the switchover control function, in order to transfer the acquired ESS-ID to the additional printer 500. The additional printer 500 accordingly acquires the common ESS-ID 'XX' for the user wireless LAN and receives the beacon transmitted from the access point 100 to enter the user wireless LAN.

FIG. 6 shows a series of processing to be carried out subsequent to the ESS-ID transfer and setting process at the timings S101 through S104 of the first embodiment shown in FIG. 3.

At a timing S401, the control module 214 of the printer 200 temporarily stops the communication as the station and disconnects the printer 200 from the user wireless LAN, while starting communication as the access point to carry out required operations including transmission of a beacon. In FIG. 6, the flag represents a time period when the printer 200 realizes the temporary communication as the access point. At a timing S402, the control module 214 detects elapse of a preset time period and temporarily stops the communication as the access point, while starting communication as the station to restore the connection with the user wireless LAN. The processing at the timings S410 and S402 is executed intermittently after the connection with the user wireless LAN, for example, at predetermined time periods or on occasions of preset events, such as an user's instruction and a supply of power.

At a timing S403, the additional printer 500 starts an ESS-ID acquiring ST (station) process in response to the user's operations of a control panel 520 on the additional printer 500. The ESS-ID acquiring ST process carries out communication as the station with an initial ESS-ID . In this embodiment, it is assumed that the initial relay ID set in the printer 200 is coincident with the initial ID of the additional printer 500.

The printer 200 temporarily stops the communication as the station, while starting the communication as the access point at a timing S404. This results in establishing a wireless network for settings between the printer 200 and the additional printer 500. At a timing S405, the printer 200 transfers the common ESS-ID 'XX' stored in the terminal storage module 212 to the additional printer 500 and sets the transferred common ESS-ID 'XX' into the additional printer 500. The additional printer 500 is accordingly disconnected from the printer 200, while starting the communication as the station with the common ESS-ID 'XX' for the user wireless LAN. The additional printer 500 detects a beacon transmitted from the access point 100 and enters the user wireless LAN for communication.

The above description regards the case of making the additional printer 500 enter the user wireless LAN with the common ESS-ID 'XX'. The ESS-ID transferred from the printer 200 to the additional printer 500 is, however, not restricted to the value 'XX' but may be any ESS-ID applicable for another wireless LAN.

The initial relay ID is used for the wireless communication as the access point established for transfer of the ESS-ID by the printer 200. A variable relay ID may alternatively be used for the wireless communication as the access point. In the case where the relay ID set in the printer 200 is different from the initial ID of the additional printer 500, the relay ID set in the printer 200 should be varied to be coincident with the initial ID of the additional printer 500, in order to attain the setting shown in FIG. 6. This procedure is discussed below as a modified example of the second embodiment.

Figure 7:
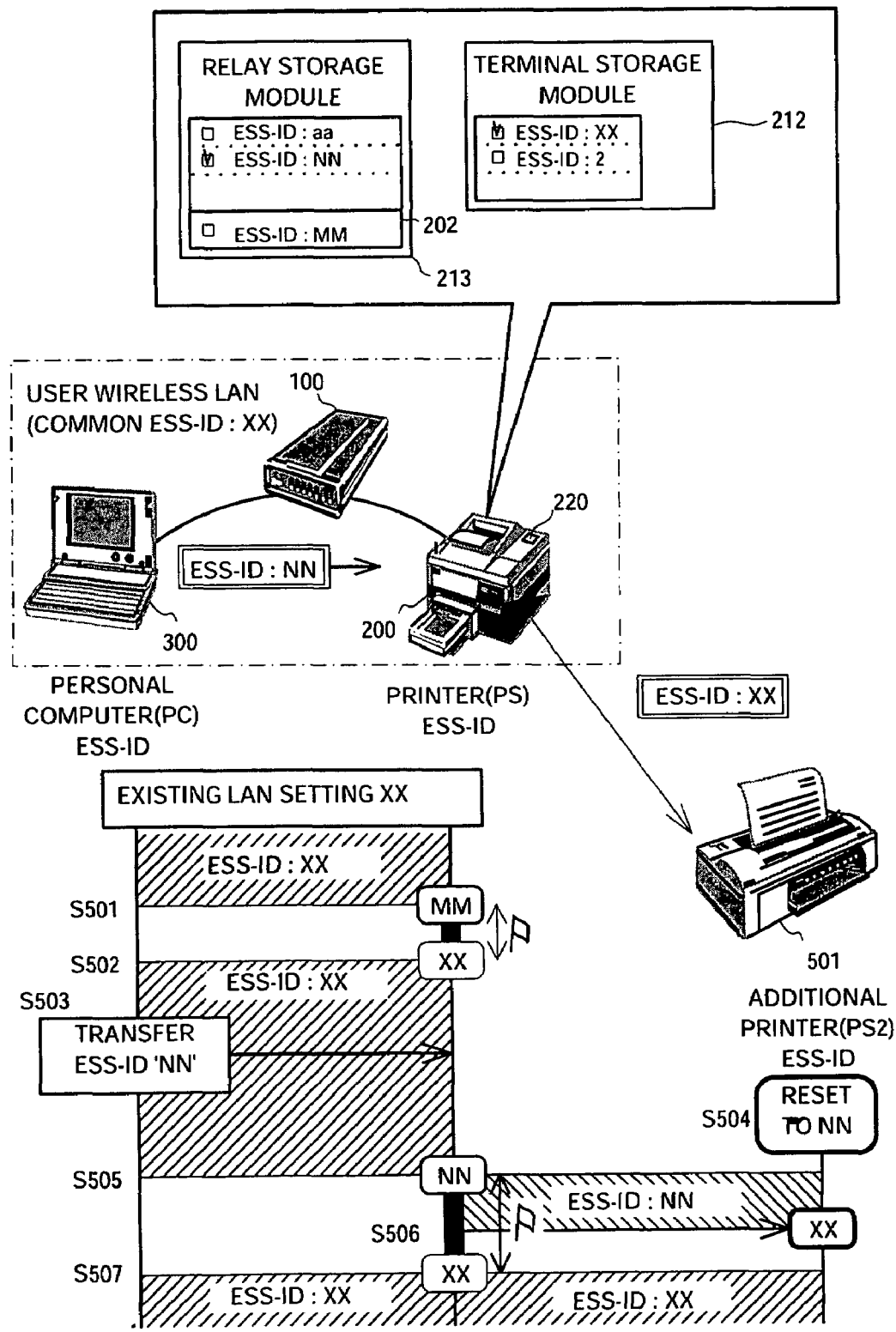
FIG. 7 shows a process of setting an ESS-ID executed in a modified example of the second embodiment.

FIG. 7 shows a setting process in the modified example of the second embodiment, where the relay ID set in the printer 200 is different from the initial ID of the additional printer 500.

In a time period between timings S501 and S502, the printer 200 carries out the access point function, like the time period between the timings S401 and S402 in FIG. 6. The printer 200 restores the connection with the user wireless LAN at a timing S502. The personal computer 300 transfers a initial ID 'NN' of an additional printer 501 to the printer 200 via the user wireless LAN, in response to the user's instruction.

The ESS-ID transferred here to the printer 200 is the initial ID 'NN' used for the communication of the additional printer 501, when the printer 200 functions as the access point. This initial ID is different from the ESS-ID to be used for the communication as the station. Simultaneously with the transfer of the ESS-ID to the printer 200, the ESS-ID acquiring ST process is activated in the additional printer 501 at a timing S504, in the same manner as discussed in the second embodiment.

At a timing S505 and subsequent timings, the printer 200 establishes communication with the additional printer 501 based on the received ESS-ID 'NN' as the relay ID and transfers and sets the common ESS-ID to and in the additional printer 510. This series of processing is identical with that of the second embodiment (refer to the timing S404 and subsequent timings in FIG. 6).

It is preferable to store the varied relay ID separately from the initial relay ID. The control panel 220 on the printer 200 preferably has a reset function for resetting the relay ID to the initial ID. The reset function ensures re-establishment of communication based on the initial relay ID, even if the ESS-ID set in the printer 200 has become completely unknown.

In the above embodiment, the relay ID used for the access point function of the printer 200 continuously performed even after acquisition of the ESS-ID is specified by the instruction of the personal computer 300 via the user wireless LAN. The relay ID is, however, not restricted to this example, but one of multiple ESS-IDs registered in advance in the printer 200 may be used in a periodic manner.

The above embodiments regard the construction of the network communication unit built in the printer 200. The arrangement of the present invention is, however, not restricted to the construction of the printer 200 but may be actualized in a print server separate from the printer. The technique of the present invention is not restricted to the wireless printing systems but may be applicable to diverse systems for connection with any wireless network.

The system of the above embodiment utilizes the transfer function of the station, in which the ESS-ID to be set is stored, to attain the settings required for connecting a device without sufficient input interfaces for settings to the existing wireless LAN. The construction may be devised to attain auto transfer and setting of the ESS-ID. Some modification of the embodiment enables the ESS-ID used for establishment of a network for settings to be flexibly varied. This ensures the enhanced usability and applicability of the technique.

The above embodiments and their modifications are to be considered in all aspects as illustrative and not restrictive. There may be many modifications, changes, and alterations without departing from the scope or spirit of the main characteristics of the present invention. For example, any of the above processing may be actualized by hardware, instead of the software. The scope and spirit of the present invention are indicated by the appended claims, rather than by the foregoing description.

What is claimed is:

1. A station that is connected with a wireless network in which multiple communication devices mutually communicate via a relay station, the station comprising:
   a terminal storage module that stores terminal identification information used for connection as a station to another relay station provided externally;
   a terminal function module that establishes a connection with a wireless network provided by the another relay station based on the terminal identification information stored in the terminal storage module;
   a relay storage module that stores relay identification information for grouping objects of communication in a wireless network;
   a relay function module that functions as a relay station to establish a wireless network based on the relay identification information stored in the relay storage module; and
   a switchover control module that switch between the terminal function module and the relay function module.

2. A station in accordance with claim 1, further comprising:
   a relay identification information write module that, during the connection established by the terminal function module to the wireless network provided by the another relay station, receives the relay identification information via the wireless network provided by the another relay station, and then writes the relay identification information into the relay storage module.

3. A station in accordance with claim 1 or 2, further comprising:
   a terminal information sending module that, when the wireless network is established by the relay function module as the relay station, sends the terminal identification information to another station which is connected with the wireless network established by the relay function module.

4. A method of causing a second station to join a first wireless network provided by a first relay station, the method comprising:
   (a) causing a first station, which has established, based on a first identification information, a connection with the first wireless network provided by the first relay station, to break the connection with the first wireless network and then provide a second wireless network as a second relay station based on a second identification information; and
   (b) causing the first station to send the first identification information to the second station which is connected with the second wireless network based on the second identification information, while the first station provides the second wireless network.

5. A method in accordance with claim 4, further comprising:
   (c) causing the second station to break the connection with the second wireless network and then establish a connection with the first wireless network based on the first identification information.

6. A method in accordance with claim 4 or 5, wherein the step (a) includes alternating
   the breaking the connection with the first wireless network and the providing the second wireless network; and
   stopping providing the second wireless network and then establishing a connection with the first wireless network.

7. A method in accordance with claim 4 or 5, wherein the step (a) includes
   causing the first station to acquire the second identification information via the first relay station.

8. A computer readable medium encoded with a computer program for causing a second station to join a first wireless network provided by a first relay station, the computer program comprising:
   causing a first station, which has established based on a first identification information a connection with the first wireless network provided by the first relay station, to break the connection with the first wireless network and then provide a second wireless network as a second relay station based on a second identification information; and
   causing the first station to send the first identification information to the second station which is connected with the second wireless network based on the second identification information, while the first station provides the second wireless network.

* * * * *